(12) United States Patent
Watanabe

(10) Patent No.: US 8,094,828 B2
(45) Date of Patent: Jan. 10, 2012

(54) SOUND SOURCE SEPARATING APPARATUS AND SOUND SOURCE SEPARATING METHOD

(75) Inventor: Masanori Watanabe, Hitachinaka (JP)

(73) Assignee: Hitachi, Ltd., Tokyo (JP)

( * ) Notice: Subject to any disclaimer, the term of this patent is extended or adjusted under 35 U.S.C. 154(b) by 291 days.

(21) Appl. No.: 12/280,020

(22) PCT Filed: Apr. 11, 2008

(86) PCT No.: PCT/JP2008/057162
§ 371 (c)(1),
(2), (4) Date: Aug. 20, 2008

(87) PCT Pub. No.: WO2008/126916
PCT Pub. Date: Oct. 23, 2008

(65) Prior Publication Data
US 2010/0226504 A1    Sep. 9, 2010

(30) Foreign Application Priority Data

Apr. 11, 2007   (JP) ................. 2007-103743

(51) Int. Cl.
*G10K 11/16*   (2006.01)
(52) U.S. Cl. ...................................... 381/71.1
(58) Field of Classification Search .................. 381/71.1
See application file for complete search history.

(56) References Cited

FOREIGN PATENT DOCUMENTS

| | | |
|---|---|---|
| JP | 05-026722 | 2/1993 |
| JP | 08-178740 | 7/1996 |
| JP | 09-021692 | 1/1997 |
| JP | 09021692 A * | 1/1997 |
| JP | 2001-165815 | 6/2001 |
| JP | 2001165815 A * | 6/2001 |
| JP | 2006-306278 | 11/2006 |

* cited by examiner

*Primary Examiner* — Marcos D. Pizarro
(74) *Attorney, Agent, or Firm* — Antonelli, Terry, Stout & Kraus, LLP.

(57) ABSTRACT

There is disclosed a sound source separating apparatus (100) including: a sound pressure detecting unit which detects a sound pressure in which fluid sound generated due to fluctuations in fluid pressure and oscillation sound generated due to oscillation of a solid are mixed; an oscillation detecting unit (2) which detects oscillation of the solid; and a sound source separating unit (3) which separates the sound pressure detected by the sound pressure detecting unit into a fluid sound component and an oscillation sound component for output by using the sound pressure detected by the sound pressure detecting unit and the oscillation detected by the oscillation detecting unit (2). By separating into the fluid sound and the oscillation sound, it is possible to effectively and rapidly implement oscillation and noise control and reduce a development period of a noise-free product.

11 Claims, 3 Drawing Sheets

SOUND SOURCE SEPARATING APPARATUS AND SOUND SOURCE SEPARATING METHOD

FIELD OF THE INVENTION

The present invention relates to a sound source separating apparatus and a sound source separating method, and is particularly suitable for a separating apparatus and a separating method of a sound source in which fluid sound generated due to fluctuations in fluid pressure and oscillation sound generated due to oscillation of a solid are mixed.

BACKGROUND OF THE INVENTION

As a conventional sound source survey method, sound source survey apparatuses have been developed and commercialized by various audio equipment manufacturers. The sound source survey apparatus is used for visualizing a sound pressure in such a manner that by using a microphone array composed of plural microphones arranged in various shapes, sound pressure distribution is computed at a certain distance on the basis of a sound pressure and phase detected by the microphone array in the principle of beam forming so as to be mapped to an image.

Further, a conventional contribution diagnostic method for examining the level of effects of a sound source or an oscillation source is disclosed in, for example, Japanese Patent Application Laid-Open No. H5-26722. In this method, respective signals of noise or oscillation detected at plural points around an apparatus or the like are input to an adaptive filter, the coefficient of the adaptive filter is updated so as to minimize a difference between the sum of output signals of the adaptive filter and a signal detected at an assessment point where the noise or oscillation is assessed, and the level of the respective sound sources or oscillation sources contributing to the noise or oscillation at the assessment point is displayed using the output signal of the adaptive filter when the difference is converged into a constant value.

However, in the above-described sound source survey method, fluid sound (e.g., blade sound generated when a propeller rotates) due to fluctuations in fluid pressure and oscillation sound (e.g., electromagnetic sound generated by oscillation of a motor) due to oscillation of a structure are mixed and displayed on identified sound pressure distribution, and thus it is impossible to separate the both sound to be displayed.

Further, in the contribution diagnostic method of a sound source or an oscillation source described in Japanese Patent Application Laid-Open No. H5-26722, the level of noise or oscillation contributing to the assessment point of the sound source is merely assessed, and thus it has been desired to effectively and rapidly implement oscillation and noise control and a method for enabling reduction in development period of a noise-free product has been desired.

SUMMARY OF THE INVENTION

An object of the present invention is to provide a sound source separating apparatus and a sound source separating method for enabling effective and rapid implementation of oscillation and noise control and reduction in development period of a noise-free product by separating into a fluid sound component and an oscillation sound component for output.

A first aspect of the present invention for achieving the above-described object is a sound source separating apparatus including: a sound pressure detecting unit which detects a sound pressure in which fluid sound generated due to fluctuations in fluid pressure and oscillation sound generated due to oscillation of a solid are mixed; an oscillation detecting unit which detects oscillation of the oscillation sound; and a sound source separating unit which separates the sound pressure detected by the sound pressure detecting unit into a fluid sound component and an oscillation sound component for output by using the sound pressure detected by the sound pressure detecting unit and the oscillation detected by the oscillation detecting unit.

Further, a second aspect of the present invention is a sound source separating apparatus including: a sound pressure detecting unit which detects a sound pressure in which fluid sound generated due to fluctuations in fluid pressure and oscillation sound generated due to oscillation of a solid are mixed; a pressure detecting unit which detects the fluctuations in fluid pressure; and a sound source separating unit which separates the sound pressure obtained by a sound pressure detecting unit into a fluid sound component and an oscillation sound component for output by using the sound pressure obtained by the sound pressure detecting unit and the fluctuations in pressure obtained by the pressure detecting unit.

Examples of more preferable concrete configurations in the first or second aspect of the present invention are as follows.

(1) The sound source separating apparatus according to the first aspect of the present invention, further including a sound pressure distribution creating unit which includes the sound pressure detecting unit and a signal processing unit which computes sound pressure distribution by using the sound pressure detected by the sound pressure detecting unit, wherein the sound source separating unit separates the sound pressure distribution obtained by the sound pressure distribution creating unit into the fluid sound component on a plane and the oscillation sound component on a plane for output by using the sound pressure distribution obtained by the sound pressure distribution creating unit and the oscillation on a plane detected by the oscillation detecting unit.

(2) The sound source separating apparatus according to the second aspect of the present invention, further including a sound pressure distribution creating unit which includes the sound pressure detecting unit and a signal processing unit which computes sound pressure distribution by using the sound pressure detected by the sound pressure detecting unit, wherein the sound source separating unit separates the sound pressure distribution obtained by the sound pressure distribution creating unit into the fluid sound component on a plane and the oscillation sound component on a plane for output by using the sound pressure distribution obtained by the sound pressure distribution creating unit and the fluctuations in pressure on a plane detected by the pressure detecting unit.

(3) The sound source separating apparatus according to (1) or (2), wherein the sound pressure distribution creating unit includes: a microphone array which detects sound pressure and phase information; the signal processing unit which computes the sound pressure distribution at a position apart from the microphone array by a certain distance by using the sound pressure and phase information detected by the microphone array; an image retrieving unit which retrieves an image of a target object; and a sound pressure visualizing unit which visualizes the sound pressure distribution by superimposing the image of the target object obtained by the image retrieving unit on the sound pressure distribution computed by the signal processing unit.

(4) The sound source separating apparatus according to (1) or (2), wherein an oscillation sensor such as an oscillatory acceleration pickup and a laser Doppler vibrometer is used as the oscillation detecting unit.

(5) The sound source separating apparatus according to (1) or (2), further including another sound pressure detecting unit or another oscillation detecting unit in accordance with the number of sound sources, wherein the sound source separating unit separates the sound pressure distribution in which respective sound sources are mixed into plural fluid sound components and plural oscillation sound components for output by using the sound pressure distribution in which the respective sound sources detected by the respective sound pressure detecting units are mixed and the oscillation on a plane detected by the respective oscillation detecting units.

(6) The sound source separating apparatus according to (1) or (2), further including a separated sound-pressure visualizing unit which visualizes and displays the fluid sound component and the oscillation sound component separated by the sound source separating unit.

(7) The sound source separating apparatus according to (1) or (2), further including a separated sound-pressure visualizing unit which visualizes and displays the fluid sound component and the oscillation sound component separated by the sound source separating unit, wherein the separated sound-pressure visualizing unit includes an image/sound pressure recombining unit and a sound pressure revisualizing unit, the sound pressure revisualizing unit includes a fluid sound visualizing unit and an oscillation sound visualizing unit, and the image/sound pressure recombining unit reflects the ratio of the oscillation sound to the fluid sound in the sound source separating unit on the sound pressure distribution of the sound pressure visualizing unit so as to be superimposed on an image for mapping.

Further, a third aspect of the present invention is a sound source separating method including the steps of: creating, by a sound pressure distribution creating unit, sound pressure distribution in which fluid sound generated due to fluctuations in fluid pressure and oscillation sound generated due to oscillation of a solid are mixed; detecting oscillation of the solid by an oscillation detecting unit; and separating, by a sound source separating unit, the sound pressure distribution obtained by the sound pressure distribution creating unit into a fluid sound component on a plane and an oscillation sound component on a plane for output by using the sound pressure distribution obtained by the sound pressure distribution creating unit and the oscillation on a plane detected by the oscillation detecting unit.

Furthermore, a fourth aspect of the present invention is a sound source separating method including the steps of: creating, by a sound pressure distribution creating unit, sound pressure distribution in which fluid sound generated due to fluctuations in fluid pressure and oscillation sound generated due to oscillation of a solid are mixed; detecting the fluctuations in fluid pressure by a pressure detecting unit; and separating, by a sound source separating unit, the sound pressure obtained by the sound pressure distribution creating unit into a fluid sound component and an oscillation sound component for output by using the sound pressure obtained by a sound pressure distribution creating unit and the fluctuations in pressure obtained by the pressure detecting unit.

According to a sound source separating apparatus and a sound source separating method of the present invention, it is possible to effectively and rapidly implement oscillation and noise control and reduce a development period of a noise-free product by separating into a fluid sound component and an oscillation sound component for output.

DESCRIPTION OF THE PREFERRED EMBODIMENTS

Figure 1:
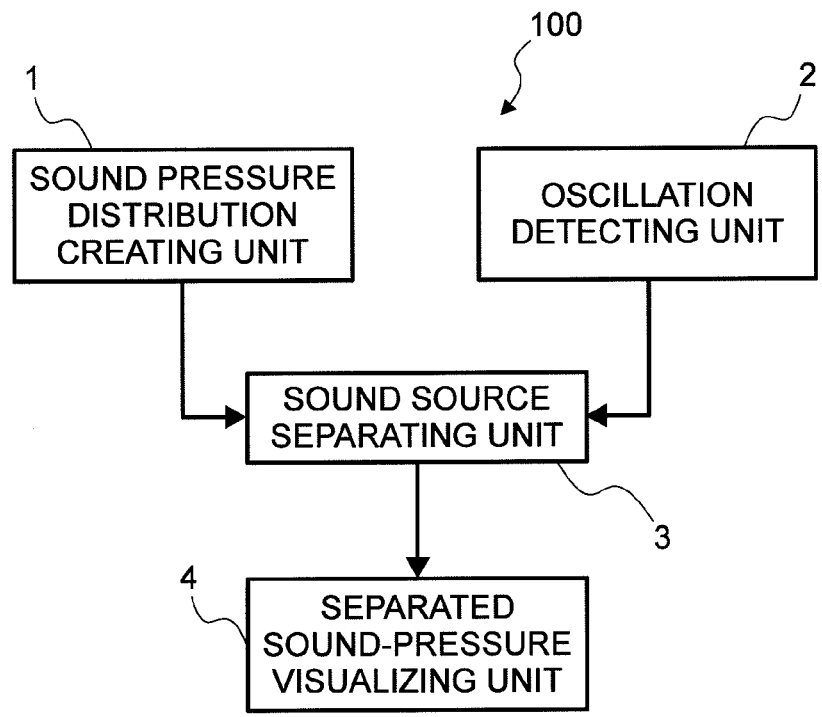
FIG. 1 is a block diagram of a sound source separating apparatus according to a first embodiment.

Hereinafter, plural embodiments of the present invention will be described using the drawings. The same reference numerals in the drawings of the respective embodiments denote the same constituent elements or equivalents thereof. It should be noted that the invention includes a highly effective aspect obtained by appropriately combining the respective embodiments with each other.

First Embodiment

Figure 3:
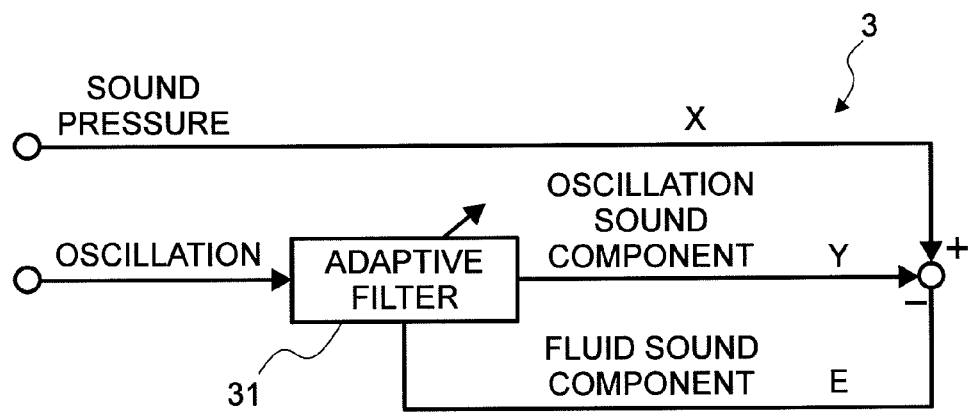
FIG. 3 is a block diagram of a sound source separating unit in FIG. 1.
Figure 4:
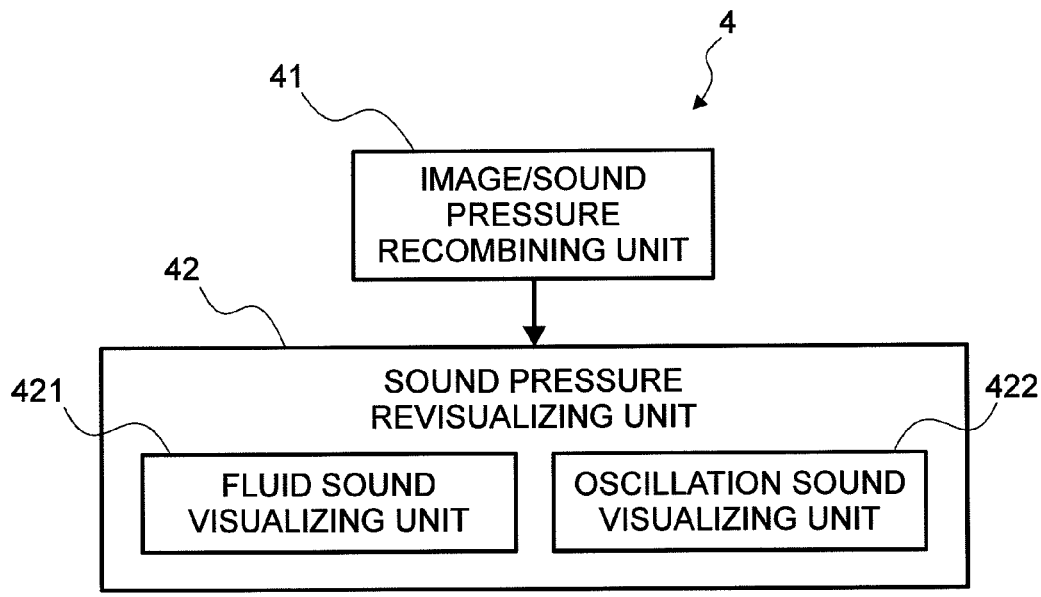
FIG. 4 is a block diagram of a separated sound-pressure visualizing unit in FIG. 1.

A first embodiment of the present invention will be described using FIGS. 1 to 4. FIG. 1 is a block diagram of a sound source separating apparatus 100 of the first embodiment, FIG. 2 is a block diagram of a sound pressure distribution creating unit 1 in FIG. 1, FIG. 3 is a block diagram of a sound source separating unit 3 in FIG. 1, and FIG. 4 is a block diagram of a separated sound-pressure visualizing unit 4 in FIG. 1.

The sound source separating apparatus 100 includes the sound pressure distribution creating unit 1, an oscillation detecting unit 2, the sound source separating unit 3, and the separated sound-pressure visualizing unit 4, as shown in FIG. 1.

The sound pressure distribution creating unit 1 creates and visualizes sound pressure distribution in which both of air sound (fluid sound) and solid sound (oscillation sound) are mixed. Here, the air sound is defined as fluid sound (e.g., blade sound generated when a propeller rotates) which is generated due to the flow of fluid and which propagates in the air, and the solid sound is defined as oscillation sound (e.g., electromagnetic sound generated by oscillation of a motor) which is generated due to oscillation of a solid or a structure and which propagates in the solid.

Figure 2:
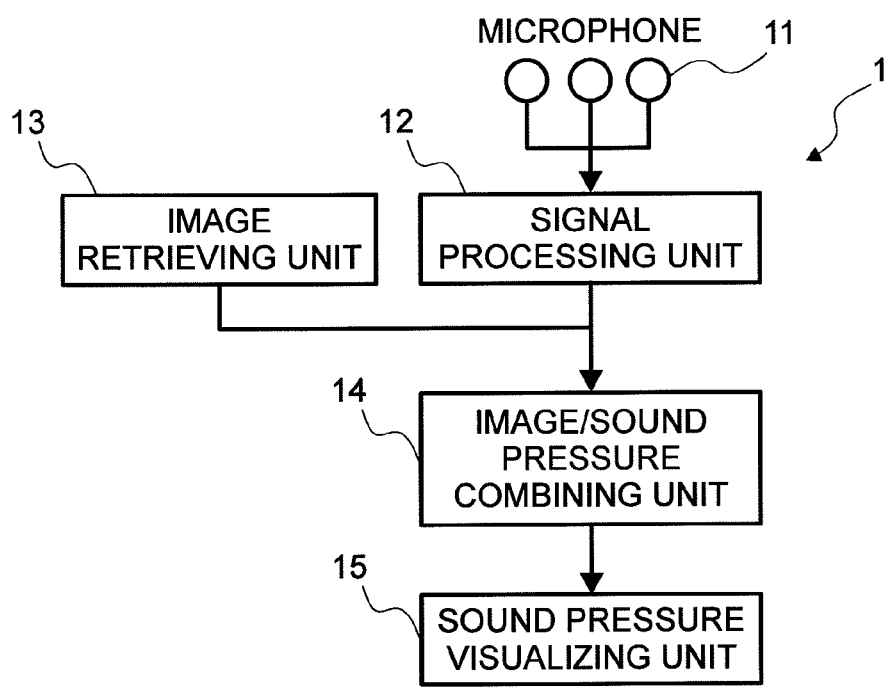
FIG. 2 is a block diagram of a sound pressure distribution creating unit in FIG. 1.

The sound pressure distribution creating unit 1 includes a microphone array 11, an image retrieving unit 13, a signal processing unit 12, an image/sound pressure combining unit 14, and a sound pressure visualizing unit 15, as shown in FIG. 2. The microphone array 11 is composed of plural microphones serving as sound pressure detecting units and detects sound pressure and phase information. The signal processing unit 12 computes sound pressure distribution at a position apart from the microphone array 11 by a certain distance on the basis of the principle of, for example, beam forming or the like by using the sound pressure and phase information detected by the microphone array 11. The image retrieving unit 13 includes a camera and the like, and retrieves an image of a target object. The image/sound pressure combining unit 14 performs mapping by superimposing the image of the target object obtained by the image retrieving unit 13 on the sound pressure distribution computed by the signal processing unit 12. The sound pressure visualizing unit 15 visualizes the mapped sound pressure distribution.

The oscillation detecting unit 2 includes an oscillation sensor (specifically, an oscillatory acceleration pickup, a laser Doppler vibrometer, or the like) for detecting oscillation of a solid or a structure that is a sound source of the oscillation sound. Outputs of the sound pressure distribution creating unit 1 correspond to the sound pressure distribution (that is, sound pressure on a certain plane). Accordingly, the oscillation detecting unit 2 also measures oscillation at many points or on a plane for output.

The sound source separating unit 3 subtracts an oscillation sound component detected by the oscillation detecting unit 2 from the sound pressure obtained by the sound pressure distribution creating unit 1 so as to separate a fluid sound component from the oscillation sound component. That is, the sound source separating unit 3 inputs therein the sound pressure obtained by the sound pressure distribution creating unit 1 and the oscillation detected by the oscillation detecting unit 2 so as to separate the fluid sound component from the oscillation sound component using an adaptive filter 31 as shown in FIG. 3.

Specifically, a signal of the oscillation detected by the oscillation detecting unit 2 is input to the adaptive filter 31, and after performing a filter coefficient operation and a convolution operation, the resultant signal is output from the filter 31. The coefficient of the adaptive filter 31 is updated so as to minimize a residual E between an output signal Y of the filter and a signal X of the detected sound pressure. By performing the process, the update of the coefficient of the adaptive filter 31 is completed at the time the residual E is converged into a constant value. The output Y of the adaptive filter 31 and the residual E at this time correspond to the oscillation sound component and the fluid sound component, respectively. Accordingly, the ratio of the oscillation sound component Y to the fluid sound component E in the sound pressure X can be specified, and thus, the oscillation sound and the fluid sound mixed in the sound pressure X can be separated.

As a separating method in the sound source separating unit 3, there are also a method using coherence and a method using an amplitude ratio of the signals as well as the method using the above-described adaptive filter. Further, there is also a method in which if the signal detected by the oscillation detecting unit 2 is, for example, an oscillatory acceleration, the signal is converted into an oscillatory velocity by an integrator, and the resultant is converted into the same dimension as the sound pressure in consideration of an area of an oscillation plane, distance attenuation, radiation efficiency and the like so as to separate the oscillation sound component from the fluid sound component after comparing the signals with each other.

The separated sound-pressure visualizing unit 4 visualizes and displays the fluid sound component and the oscillation sound component separated by the sound source separating unit 3. The separated sound-pressure visualizing unit 4 includes an image/sound pressure recombining unit 41 and a sound pressure revisualizing unit 42, as shown in FIG. 4. The sound pressure revisualizing unit 42 further includes a fluid sound visualizing unit 421 and an oscillation sound visualizing unit 422. The image/sound pressure recombining unit 41 reflects the ratio of the oscillation sound to the fluid sound in the above-described sound source separating unit 3 on the sound pressure distribution of the sound pressure visualizing unit 15 of the above-described sound pressure distribution creating unit 1 so as to be superimposed on the image again for mapping. The result thereof is displayed by the sound pressure revisualizing unit 42. The visualized result can display the sound pressure distribution before and after separation, and the oscillation sound component and the fluid sound component can be individually displayed by switching.

As described above, the sound pressure and the oscillation are compared on a plane in the first embodiment. Specifically, the sound pressure distribution detected by the sound pressure distribution creating unit 1 is represented in a coordinate in which a horizontal axis serves as an X-axis and a vertical axis serves as a Y-axis, and the sound pressure in the coordinate is used. In the meantime, the oscillation is similarly detected on a plane by the oscillation detecting unit, and the oscillation is represented in a coordinate in which a horizontal axis serves as an X-axis and a vertical axis serves as a Y-axis, and the oscillation in the coordinate is used. The number of points used in the separation is controlled by the number of divisions with the horizontal axis and the vertical axis. It is determined based on the magnitude, frequency, separation resolution, and the like of the sound source. As described above, the sound source separating process is performed for the sound pressure and oscillation on a plane, so that the separation result can be obtained as distribution on the plane, thus, enabling visualization in real time.

As described above, according to the first embodiment, the fluid sound component and the oscillation sound component can be separated from the sound pressure distribution in which the fluid sound and the oscillation sound are mixed, so that the sound source separating apparatus 100 can be used as an effective tool for solving the oscillation and noise problems of automobiles, industrial instruments, home electric appliances, and the like. If it can be found whether the sound source is the fluid sound or the oscillation sound, a solving method can be effectively and rapidly created.

Second Embodiment

Figure 5:
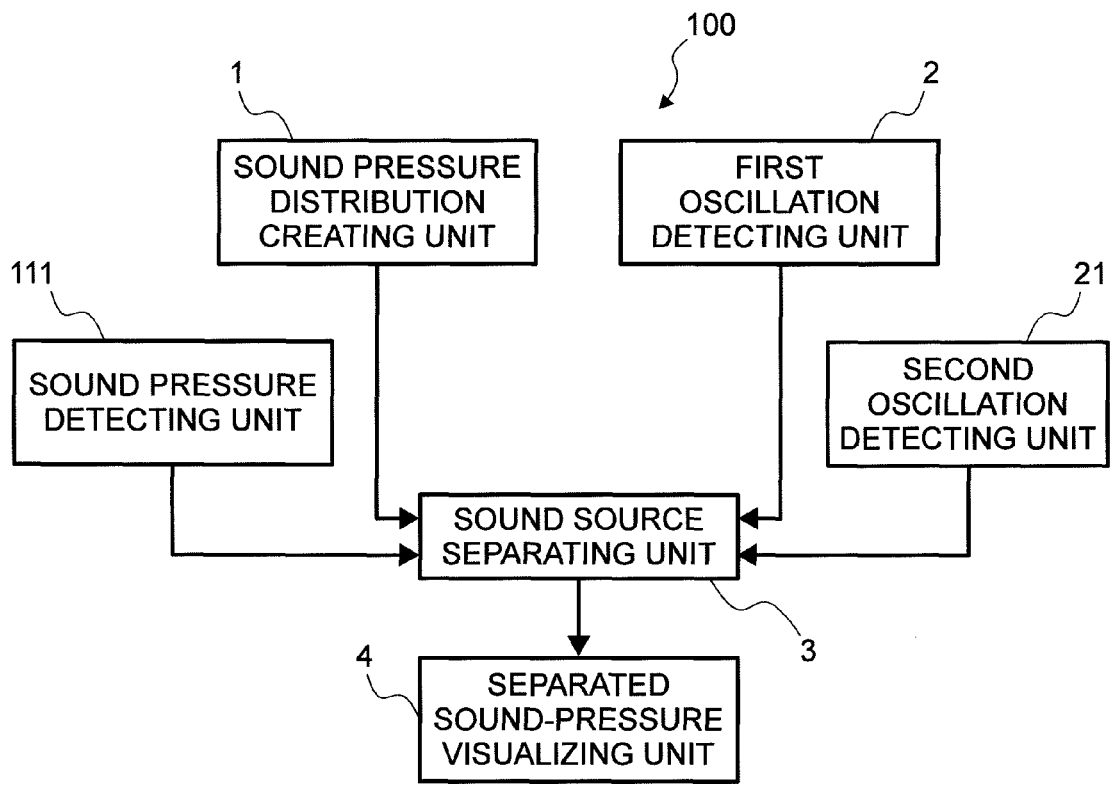
FIG. 5 is a block diagram of a sound source separating apparatus according to a second embodiment of the present invention.

Next, a second embodiment of the present invention will be described using FIG. 5. FIG. 5 is a block diagram of a sound source separating apparatus according to the second embodiment of the present invention. It should be noted that the second embodiment is different from the first embodiment in the following points, but is basically the same as the first embodiment in the other points, and thus the overlapped explanation will not be repeated.

In the first embodiment, there has been described a case in which the sound sources are the fluid sound of one kind and the oscillation sound of one kind. However, the present invention is effective in the case where the kind of fluid sound and oscillation sound increases to plural kinds. The second embodiment is an embodiment corresponding to a case in which the kind of fluid sound and oscillation sound increases to plural kinds. FIG. 5 shows a block diagram of a case in which two kinds of fluid sound and two kinds of oscillation sound are present, and four kinds of sound sources are present in total. The sound source separating apparatus 100 of the second embodiment is additionally provided with a sound pressure detecting unit 111 in addition to the sound pressure distribution creating unit 1 in accordance with the number of sound sources of the oscillation sound, and is additionally provided with a second oscillation detecting unit 21 in addition to the first oscillation detecting unit 2 in accordance with the number of sound sources of the oscillation sound.

A sound source separating method in this case is as follows. In the first place, a first oscillation sound component is separated, by the sound source separating unit 3, using the oscillation detected by the first oscillation detecting unit 2 from the sound pressure of the sound pressure distribution creating unit 1 in which four kinds of sound sources are mixed. Next, a second oscillation sound component is separated, by the sound source separating unit 3, using the oscillation detected by the second oscillation detecting unit 21 from the sound pressure from which the first oscillation sound component is separated. Finally, a first fluid sound component is separated, by the sound source separating unit 3, using the sound pressure detected by the sound pressure detecting unit 111. Accordingly, the rest of the components are a second fluid sound component. The order of the separation is not particularly specified. As described above, the sound pressure detecting unit and the oscillation detecting unit are added in accordance with the number of sound sources so as to enable separation of plural kinds of sound sources.

Third Embodiment

Figure 6:
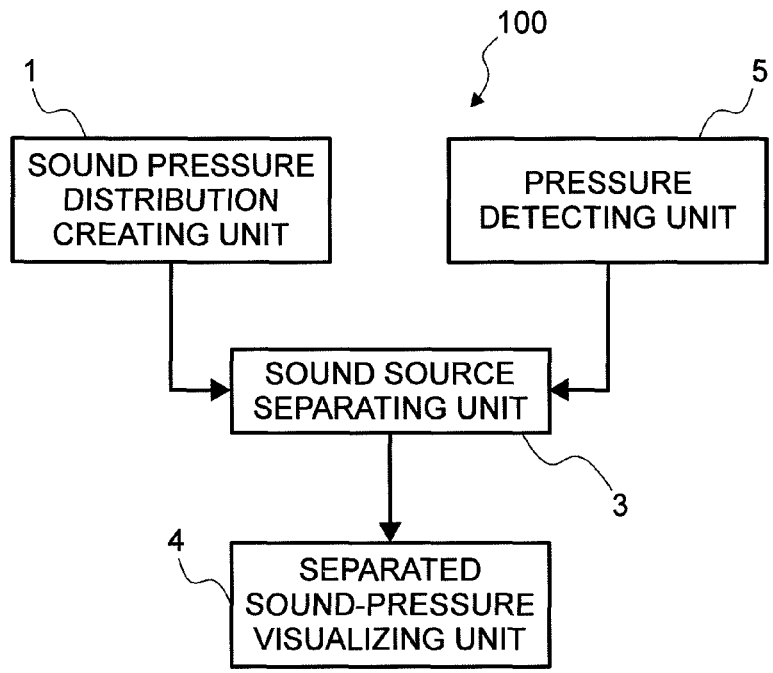
FIG. 6 is a block diagram of a sound source separating apparatus according to a third embodiment of the present invention.

Next, a third embodiment of the present invention will be described using FIG. 6. FIG. 6 is a block diagram of a sound source separating apparatus according to the third embodiment of the present invention. It should be noted that the third embodiment is different from the first embodiment in the following points, but is basically the same as the first embodiment in the other points, and thus the overlapped explanation will not be repeated.

In the third embodiment, a pressure detecting unit 5 is used in place of the oscillation detecting unit 2 of the first embodiment. Thus, the process in the sound source separating unit 3 is slightly different from that in the first embodiment. That is, the pressure of the fluid is used as a signal, so that the fluid sound component, not the oscillation sound component, is subtracted from the sound pressure distribution in which the fluid sound and the oscillation sound are mixed. The other configurations and processes are the same as the first embodiment.

What is claimed is:

1. A sound source separating method comprising the steps of:
   creating, by a sound pressure distribution creating unit, sound pressure distribution in which fluid sound generated due to fluctuations in fluid pressure and oscillation sound generated due to oscillation of a solid are mixed;
   detecting oscillation of the solid by an oscillation detecting unit; and
   separating, by a sound source separating unit, the sound pressure distribution obtained by the sound pressure distribution creating unit into a fluid sound component on a plane and an oscillation sound component on a plane for output by using the sound pressure distribution obtained by the sound pressure distribution creating unit and the oscillation on a plane detected by the oscillation detecting unit.

2. A sound source separating method comprising the steps of:
   creating, by a sound pressure distribution creating unit, sound pressure distribution in which fluid sound generated due to fluctuations in fluid pressure and oscillation sound generated due to oscillation of a solid are mixed;
   detecting the fluctuations in fluid pressure by a pressure detecting unit; and
   separating, by a sound source separating unit, the sound pressure distribution obtained by the sound pressure distribution creating unit into a fluid sound component and an oscillation sound component for output by using the sound pressure distribution obtained by the sound pressure distribution creating unit and the fluctuations in pressure on a plane obtained by the pressure detecting unit.

3. A sound source separating apparatus comprising:
   a sound pressure detecting unit which detects a sound pressure in which fluid sound generated due to fluctuations in fluid pressure and oscillation sound generated due to oscillation of a solid are mixed;
   an oscillation detecting unit which detects oscillation of the oscillation sound; and
   a sound source separating unit which separates the sound pressure detected by the sound pressure detecting unit into a fluid sound component and an oscillation sound component for output by using the sound pressure detected by the sound pressure detecting unit and the oscillation detected by the oscillation detecting unit.

4. The sound source separating apparatus according to claim 3, further comprising a sound pressure distribution creating unit which includes the sound pressure detecting unit and a signal processing unit which computes sound pressure distribution by using the sound pressure detected by the sound pressure detecting unit,
   wherein the sound source separating unit separates the sound pressure distribution obtained by the sound pressure distribution creating unit into the fluid sound component on a plane and the oscillation sound component on a plane for output by using the sound pressure distribution obtained by the sound pressure distribution creating unit and the oscillation on a plane detected by the oscillation detecting unit.

5. A sound source separating apparatus comprising:
   a sound pressure detecting unit which detects a sound pressure in which fluid sound generated due to fluctuations in fluid pressure and oscillation sound generated due to oscillation of a solid are mixed;
   a pressure detecting unit which detects the fluctuations in fluid pressure; and
   a sound source separating unit which separates the sound pressure obtained by the sound pressure detecting unit into a fluid sound component and an oscillation sound component for output by using the sound pressure obtained by the sound pressure detecting unit and the fluctuations in pressure obtained by the pressure detecting unit.

6. The sound source separating apparatus according to claim 5, further comprising a sound pressure distribution creating unit which includes the sound pressure detecting unit and a signal processing unit which computes sound pressure distribution by using the sound pressure detected by the sound pressure detecting unit,
   wherein the sound source separating unit separates the sound pressure distribution obtained by the sound pressure distribution creating unit into the fluid sound component on a plane and the oscillation sound component on a plane for output by using the sound pressure distribution obtained by the sound pressure distribution creating unit and the fluctuations in pressure on a plane detected by the pressure detecting unit.

7. The sound source separating apparatus according to claim 4 or 6,
   wherein the sound pressure distribution creating unit includes:
   a microphone array which detects sound pressure and phase information;
   the signal processing unit which computes the sound pressure distribution at a position apart from the microphone array by a certain distance by using the sound pressure and phase information detected by the microphone array;

an image retrieving unit which retrieves an image of a target object; and a sound pressure visualizing unit which visualizes the sound pressure distribution by superimposing the image of the target object obtained by the image retrieving unit on the sound pressure distribution computed by the signal processing unit.

8. The sound source separating apparatus according to claim 4 or 6, wherein an oscillation sensor such as an oscillatory acceleration pickup and a laser Doppler vibrometer is used as the oscillation detecting unit.

9. The sound source separating apparatus according to claim 4 or 6, further comprising another sound pressure detecting unit or another oscillation detecting unit in accordance with the number of sound sources, wherein the sound source separating unit separates the sound pressure distribution in which respective sound sources are mixed into a plurality of fluid sound components and a plurality of oscillation sound components for output by using the sound pressure distribution in which the respective sound sources detected by the respective sound pressure detecting units are mixed and the oscillation on a plane detected by the respective oscillation detecting units.

10. The sound source separating apparatus according to claim 4 or 6, further comprising a separated sound-pressure visualizing unit which visualizes and displays the fluid sound component and the oscillation sound component separated by the sound source separating unit.

11. The sound source separating apparatus according to claim 4 or 6, further comprising a separated sound-pressure visualizing unit which visualizes and displays the fluid sound component and the oscillation sound component separated by the sound source separating unit, wherein the separated sound-pressure visualizing unit includes an image/sound pressure recombining unit and a sound pressure revisualizing unit, the sound pressure revisualizing unit includes a fluid sound visualizing unit and an oscillation sound visualizing unit, and the image/sound pressure recombining unit reflects the ratio of the oscillation sound to the fluid sound in the sound source separating unit on the sound pressure distribution of the sound pressure visualizing unit so as to be superimposed on an image for mapping.

* * * * *